(12) United States Patent
Niedworok (10) Patent No.: US 8,721,230 B2
(45) Date of Patent: May 13, 2014

(54) METHOD OF FILLING LARGE-CAPACITY STORAGE SILOS WITH A FLUIDIZABLE MATERIAL, AND ARRANGEMENT THEREFOR

(75) Inventor: Carsten Niedworok, Moorrege (DE)

(73) Assignee: IBAU HAMBURG Ingenieurgesellschaft Industriebau mbH, Hamburg (DE)

( * ) Notice: Subject to any disclaimer, the term of this patent is extended or adjusted under 35 U.S.C. 154(b) by 1102 days.

(21) Appl. No.: 11/778,856

(22) Filed: Jul. 17, 2007

(65) Prior Publication Data
US 2008/0063495 A1    Mar. 13, 2008

(30) Foreign Application Priority Data
Sep. 8, 2006  (EP) ..................................... 06018814

(51) Int. Cl.
*B65G 53/60*   (2006.01)
(52) U.S. Cl.
CPC ....................................... *B65G 53/60* (2013.01)
USPC ............................ 406/172; 406/168; 406/197
(58) Field of Classification Search
USPC .......... 406/155, 168, 170–172, 181, 154, 145, 406/198, 141; 198/359; 414/299, 293, 304
See application file for complete search history.

(56) References Cited

U.S. PATENT DOCUMENTS

| | | | | |
|---|---|---|---|---|
| 3,656,717 A | * | 4/1972 | Klein et al. | 366/106 |
| 3,739,893 A | * | 6/1973 | Kaufmann | 193/17 |
| 3,827,578 A | * | 8/1974 | Hough | 406/182 |
| 3,867,969 A | * | 2/1975 | Garnett | 141/59 |
| 4,007,842 A | * | 2/1977 | Hough | 406/182 |
| 4,095,625 A | * | 6/1978 | Marpe | 141/93 |
| 4,239,421 A | * | 12/1980 | Krauss | 406/12 |
| 4,352,569 A | * | 10/1982 | Krauss | 366/107 |
| 4,375,335 A | * | 3/1983 | Klein-Albenhausen | 366/15 |
| 4,382,723 A | * | 5/1983 | Moller | 406/90 |
| 4,391,528 A | * | 7/1983 | Klein-Albenhausen | 366/15 |
| 4,491,419 A | * | 1/1985 | Ahrens et al. | 366/101 |
| 4,534,653 A | * | 8/1985 | Courtay | 366/106 |
| 4,542,991 A | * | 9/1985 | Krauss et al. | 366/106 |
| 4,552,573 A | * | 11/1985 | Weis et al. | 55/312 |
| 4,564,317 A | * | 1/1986 | Farber | 406/56 |
| 6,471,029 B1 | * | 10/2002 | Pierce | 193/14 |
| 6,632,063 B1 | | 10/2003 | Karlsen et al. | 414/299 |
| 6,729,365 B1 | * | 5/2004 | Cote et al. | 141/69 |
| 7,407,345 B2 | * | 8/2008 | Karlsen et al. | 406/156 |

FOREIGN PATENT DOCUMENTS

DE   3520498 A1   1/1986
DE   60014050 T2   9/2005

* cited by examiner

*Primary Examiner* — William R Harp
(74) *Attorney, Agent, or Firm* — Roberts & Roberts, LLP (57) ABSTRACT

The invention relates to a method of, and an arrangement for, filling a large-capacity silo with a fluidizable material while preventing air-flow or gas-flow separation, in the case of which the material-charging operation takes place in a controlled manner via a delivery line, feed channel and air- or gas-delivery channels into the top part of the large-capacity silo, towards the silo wall, and downwards to the surface of the material above the base of the large-capacity silo. The material-charging operation is combined with a uniform and controlled suction-extraction operation for air or gas, which is carried out by means of one or more essentially annular suction-extraction lines, arranged directly beneath the silo top, or via annular suction gaps on the material-outflow heads.

20 Claims, 8 Drawing Sheets

Fig. 6a Direct suction extraction of air via annular gap on outflow head

METHOD OF FILLING LARGE-CAPACITY STORAGE SILOS WITH A FLUIDIZABLE MATERIAL, AND ARRANGEMENT THEREFOR

BACKGROUND OF THE INVENTION

1. Field of the Invention

The present invention relates to a method of filling large-capacity storage silos with a fluidizable material, and to an arrangement for filling the same.

2. Description of the Related Art

When filling large-capacity silos, in particular with fine-grain, easily fluidizable bulk materials with particle sizes of less than 200 μm, it is observed that air flows and dead spaces which give rise to occurrences of separation in accordance with particle size are established above the silo filling. The fine material is preferably deposited in the outer silo sections, in the vicinity of the wall, or in the dead spaces of the air flow, and the less fine material is preferably deposited in the centre of the silo. The phenomenon of air-flow separation is established, in particular, in storage silos for aluminium oxide, the silo having diameters of over 30 m and in which, with moisture content <1%, the material is very easily fluid and fluidizable and the particle size ranges from approximately 1 μm to 200 μm. For example a fraction of approximately 5-10% of fine material with particle sizes <45 μm is present here on average. Within the silo, the fine material is distributed with a decreasing concentration from the outer section at the wall to the inner section in the centre. In unfavourable cases, it may be that individual outer silo sections have an accumulation of up to 70% of fine material. If the separated material is removed, this results in considerable problems in subsequent further processing for the production of aluminium.

In order to keep the separation effects to a low level, a series of methods has been developed up until now. Gisle G. Enstad's publication in POSTEC Newsletter No. 16, December 1997, pages 27-30 proposes a central filling pipe which runs from the silo top to the silo base and allows filling to take place from bottom to top through a plurality of opening flaps. DE 600 14050 T2 uses a plurality of distributor pipes which run along the wall in the interior of the silo. The material is largely vented, prior to entering into the silo, via a venting box and, if appropriate, a material distributor. The silo or the large-capacity container has inlets for ambient air and outlets for the removal of air. To this extent, this means can at best, if at all, counteract air-flow separation, but cannot prevent it, because the material only displaces the air in the silo during filling and dead spaces are created for the air flow. Secondly, it is also the case that the pipes constitute significant installations in the silo which, although more robust than in the first-mentioned publication, are subjected to large material forces and can therefore fracture and, during emptying, tend to block up as a result of the material compacting over time. The abovementioned DE document attempts to take account of the failure of distributor pipes by way of branch lines or bypass lines, but it is also possible for blocking to occur in any bypass line.

It is an object of the present invention completely to avoid the above problems, in particular the dead spaces for the air flow in the outer silo sections, in the vicinity of the wall, within the large-capacity silo, in order that separation can be reliably avoided. The object of the invention is also to provide a corresponding arrangement which is straightforward to construct and to operate and is cost-effective to produce. These objects are achieved according to the invention by the method and by the arrangement herein.

At the same time, the silo is filled in a controlled manner such that the fine material is deposited mostly in the inner sections, while the coarse material is deposited mostly in the outer sections, this counteracting the natural distribution on account of the air flow in the silo. The method of distribution can be influenced by the specific suction extraction of air in the silo according to the invention. The invention forms an arrangement which is not provided in the material and is not subjected to any silo forces and does not result in any disturbances during silo operation.

The arrangement serves for filling large-capacity silos with materials which are fluidizable and tend to show signs of separation as a result of the air flows in silos. The invention will be explained in more detail hereinbelow with reference to drawings which are intended to give a better understanding of the invention, although the latter is not restricted thereto.

DESCRIPTION OF THE INVENTION

Figure 1:
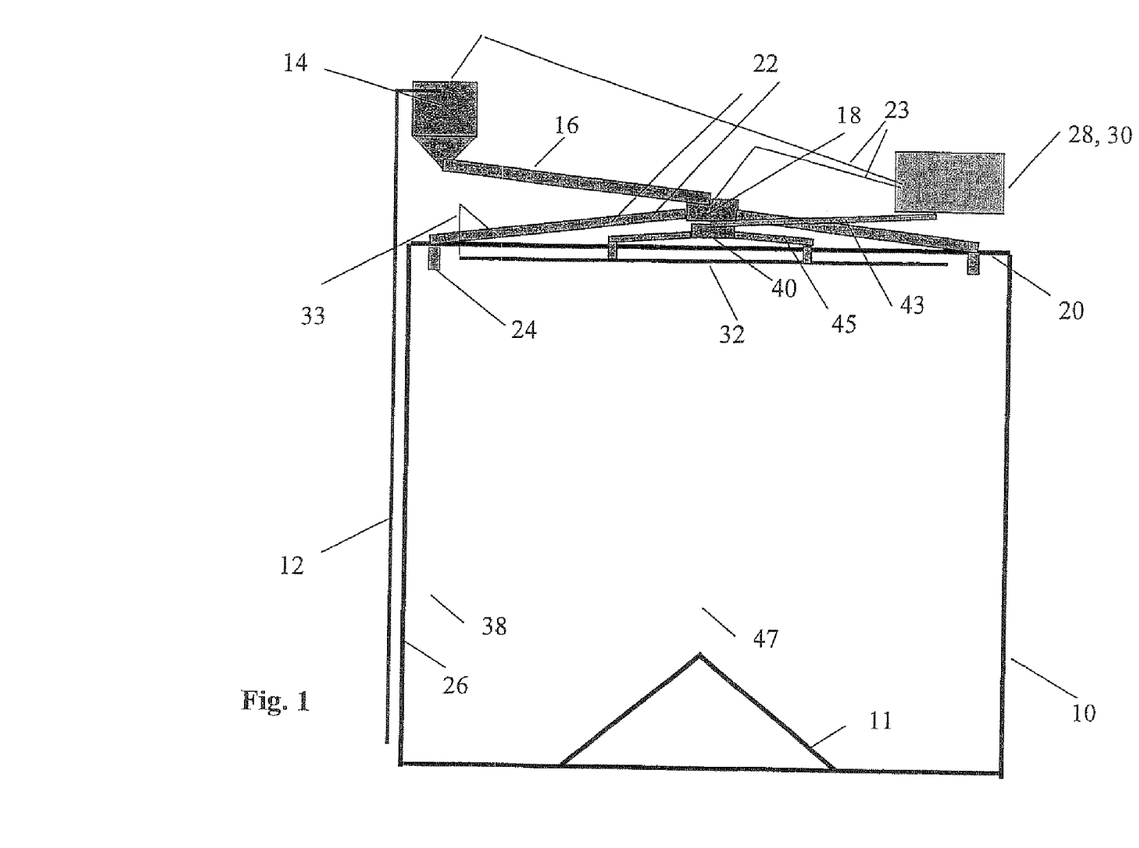
FIG. 1 shows a schematic cross-sectional view of a large-capacity silo with the filling and suction-extraction means.
Figure 2:
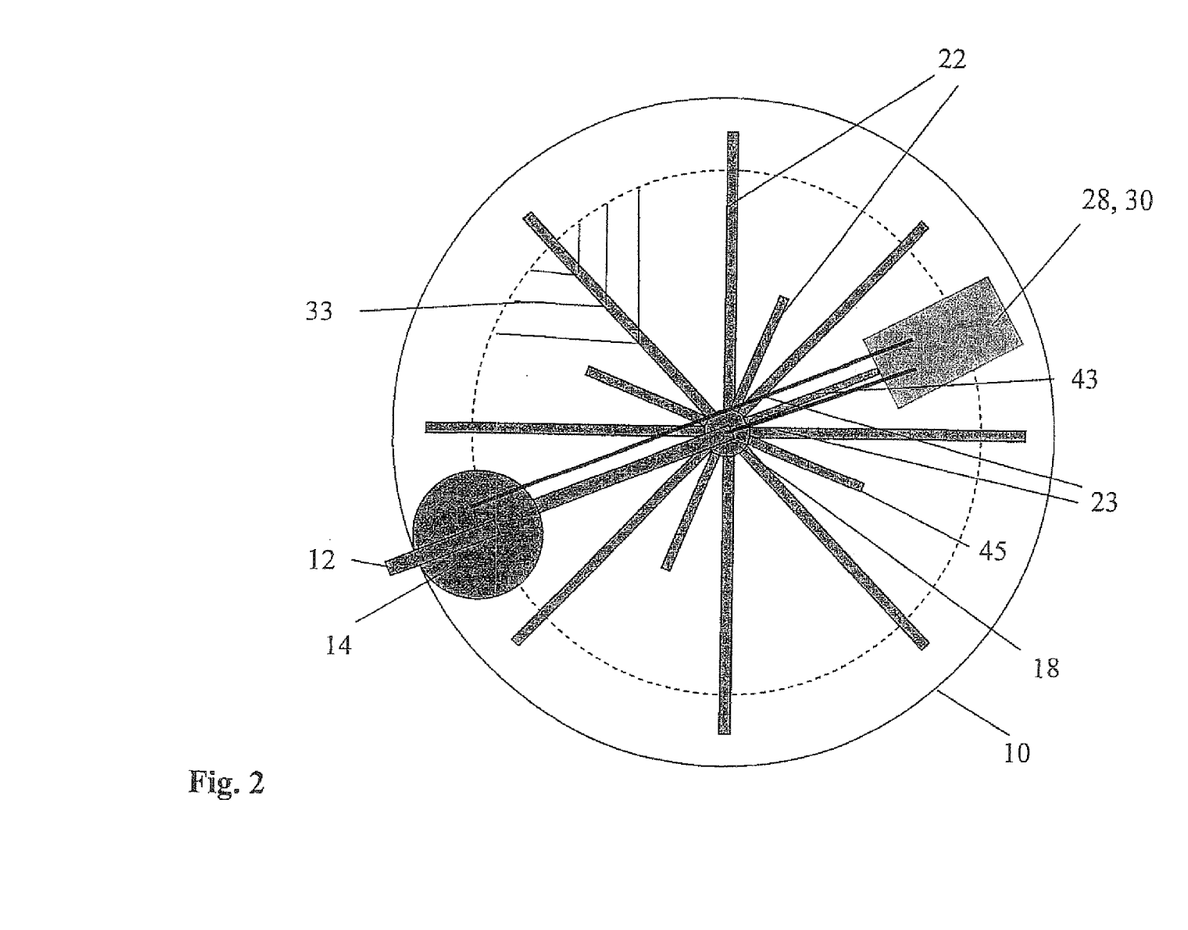
FIG. 2 shows a plan view of the silo top with the filling means.

With reference to FIGS. 1 and 2, the silo 10, which has a silo base 11 with a loading-relief cone, is charged from above by pneumatic or mechanical delivery means, in particular the delivery line 12. In the case of pneumatic charging, the supply material passes first of all into an expansion vessel 14, in order to separate off the delivery air as far as possible from the material, so that the smallest possible amount of air enters into the silo 10 from the outside with the material. From the expansion vessel 14, the supply material passes, via an air-delivery channel 16, into a centrally arranged parallel distributor 18 on the silo top 20, this distributor being adjoined by a plurality of radially arranged air-delivery channels 22 via which the material falls into the silo 10, through the silo top 20, at outflow heads 24. The charging operation in the vicinity of the silo wall 26 with a multiplicity of discharging locations and/or outflow heads 24 for the delivery channels 22 ensures that there are virtually no dead spaces, if any at all, for the air flow in the vicinity of the wall and, at the same time, the supply material is distributed uniformly in the silo 10. The number and length of the air-delivery channels 22 depend on the silo diameter and the uniform material distribution desired and the minimization, or elimination, of dead spaces. As the diameter increases, use is made of more, and longer, channels 22. The person skilled in the art will select the number and length as desired.

A small quantity of fluidizing air flows against the underside of the air-delivery channels 22. The air supplied to the channels 22 is extracted by suction via the upper enclosure of the channels 22 or the parallel distributor 18, via a central filter 28, in which case a negative pressure is produced in the upper enclosure. The quantity of air extracted by suction is set via the dimensioning of the suction fan 30 such that it is likewise possible for the quantity of air displaced in the silo 10 by the material introduced, and possibly for some of the air used for aerating the silo base, also to be extracted by suction. In addition, air is extracted by suction from the expansion vessel 14 and the parallel distributor 18 via suction-extraction lines 23.

Figure 3:
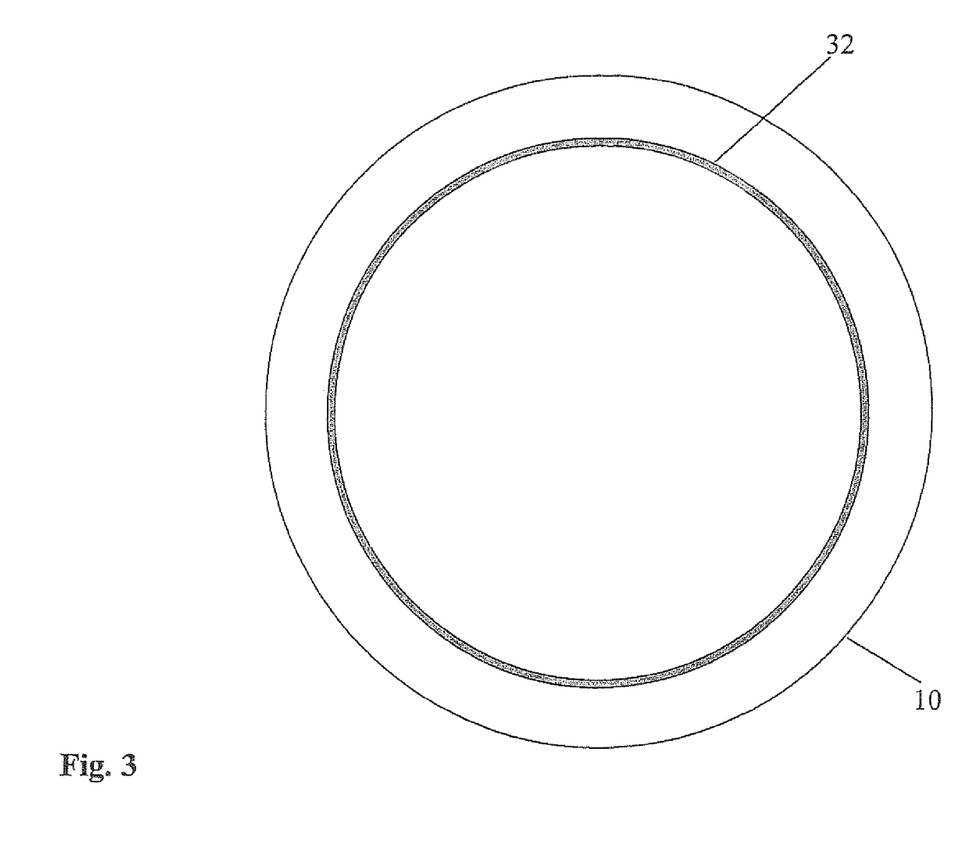
FIG. 3 shows a section in the silo taken above the annular line for the suction extraction of air.
Figure 4:
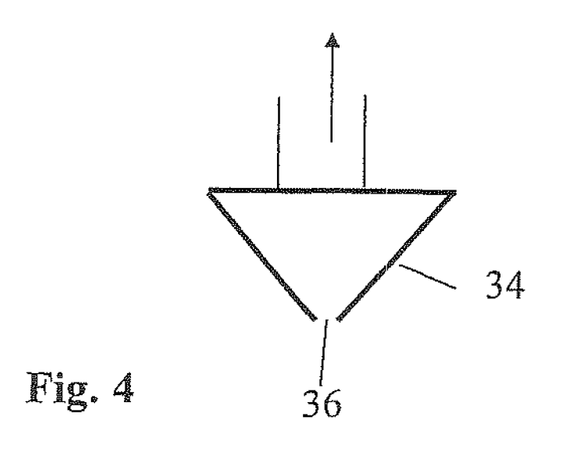
FIG. 4 shows a section through the profile of the means for the suction extraction of air.

The air in the silo 10 is extracted by suction beneath the silo top 20 by way of one or more annular suction-extraction lines 32 (see FIG. 3) which, in the embodiment illustrated, are connected to the air-delivery channels 22 above the silo top 20 via pipes in the form of intake lines 33. The suction-extraction lines 32 beneath the silo top 20 ensure uniform suction extraction of the quantity of air displaced in the silo 10, and thus a uniform and specific air flow in the silo 10. Uniform suction extraction is understood as meaning extraction of air from the entire top part of the silo, over the silo circumference. A suction-extraction line 32 advantageously comprises a plurality of rectilinear sheet-metal profiles 34 which are open in the downward direction and are welded to one another. The profiles 34 have a suction gap 36 of approximately 1 cm in size (see FIG. 4) and walls which are inclined by approximately 45° to 30° in relation to the vertical and via which the air is extracted by suction, and settled particles of dust in the annular line can be separated out again and fall back into the silo 10 through the gap 36. The width of the gap 36 and of the annular line 32, and the number of intake locations and/or intake lines between the annular line 32 and air-delivery channels 22 are selected so as to give, as far as possible, the same resistance over the entire cross section of the silo. It is possible here for a plurality of intake lines 33 to be brought together at one channel or the parallel distributor 18.

Figure 5:
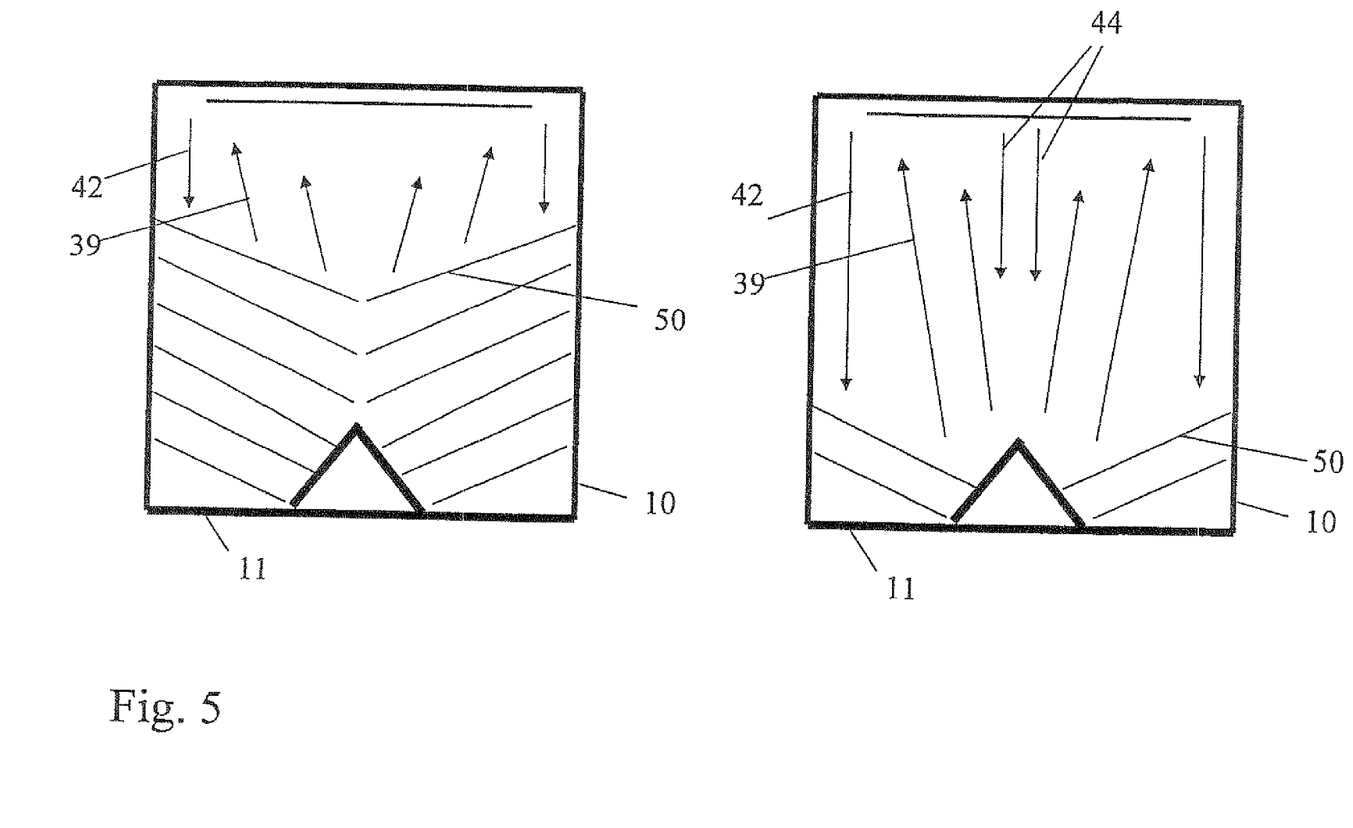
FIG. 5 shows a section in the silo of an illustration of different filling levels and material and air flows.

The functioning of the annular lines 32 for the uniform suction extraction of the quantity of air displaced by the material is at its most favourable when the silo 10 is operated at a filling level of approximately 60-70% (see FIG. 5), which is usually the aim in practice. Upon initial filling, the functioning of the suction extraction is somewhat less effective at the start. Silo charging is thus particularly important here. According to the invention, the suction-extraction operation is combined with the charging operation. At each material-discharging location, a downwardly directed air flow is indicated, and this results in an upwardly directed air flow at the locations where there is no material flowing (see FIG. 5).

In order to avoid dead spaces in the outer silo section 38, the material 42 is introduced with a downwardly directed flow in the vicinity of the silo walls 26, via a multiplicity of air-delivery channels 22, such that some of it impinges directly on the silo walls 26. An oppositely directed air flow 39 in the centre of the silo 10 is assisted by the material-displacement effect from the silo base 11 or the respectively material filling 50. The suction-extraction means are thus expediently located upstream of the material-discharging location, as seen from the centre of the silo.

Figure 8:
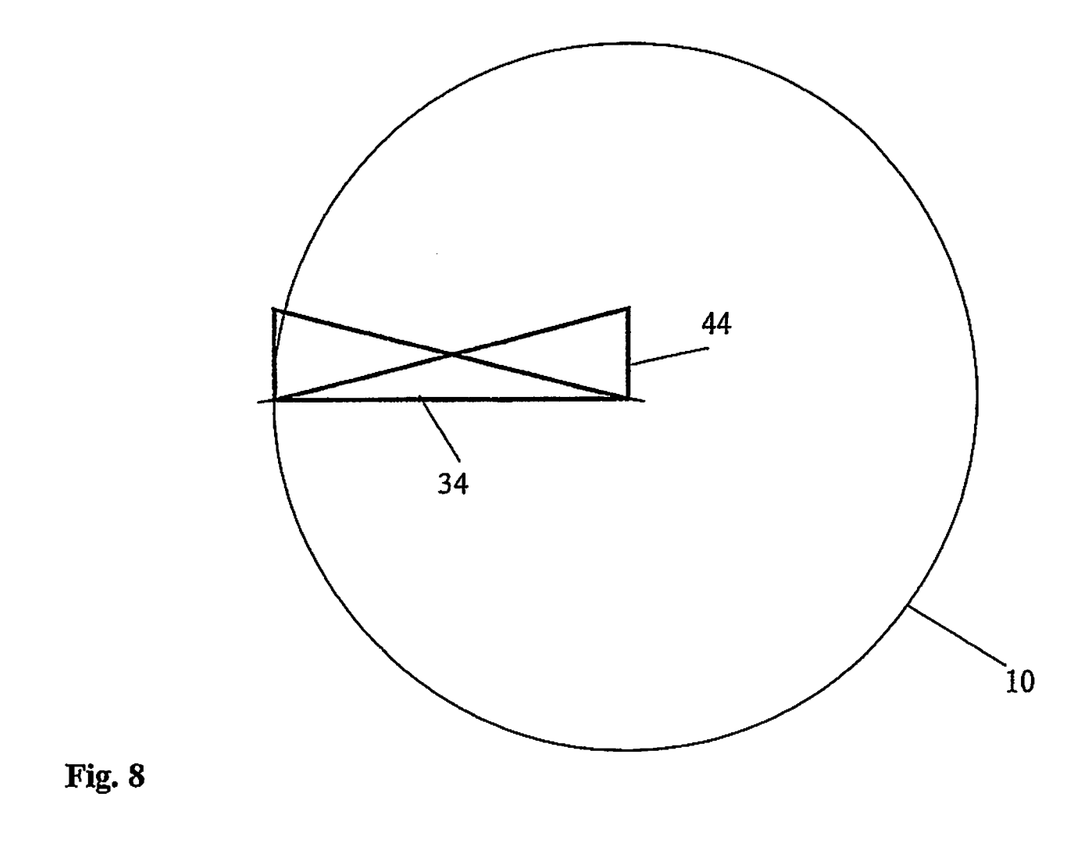
FIG. 8 shows the superimposition of gradients of fine material in the silo and a schematic illustration of the concentration of fine material as a result of fresh material and of the return of filter material.

Supplying the suction-extracted air to the air-delivery channels 22 acts like a preliminary separation of the particles of dust upstream of the filter with a return of the coarser particles of dust via the supply material into the silo 10. The fraction of fine material extracted by suction via the filter may be returned into the silo 10 specifically via a second parallel distributor 40 and separate air-delivery channels 45. The fine material 44 here is expediently supplied in the centre, rather than on the outside, via a plurality of supply locations in order to ensure compensation for the fine-material distribution (see FIG. 8) on account of the supply material (fresh material) 42 and of the fine material 44 returned via the return line 43 (see FIG. 2). The quantity of fine material supplied separately and guided via the filter 28, and thus the concentration of fine material 44 in the centre of the silo, can be influenced by the suction fan 30. In order to change the quantity of fine material, a speed-controlled suction fan 30 is advantageous. In the most favourable case, it is thus possible to ensure homogeneous distribution of the fine material from the outside 38 to the inside 47.

Figure 6:
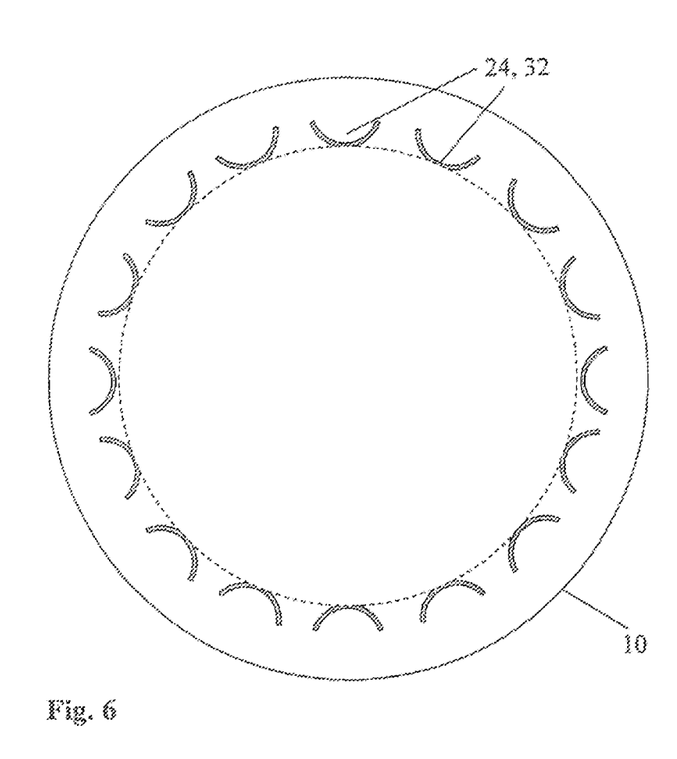
FIG. 6 shows suction extraction at the outflow heads as a variant to the annular line.
Figure 6A:
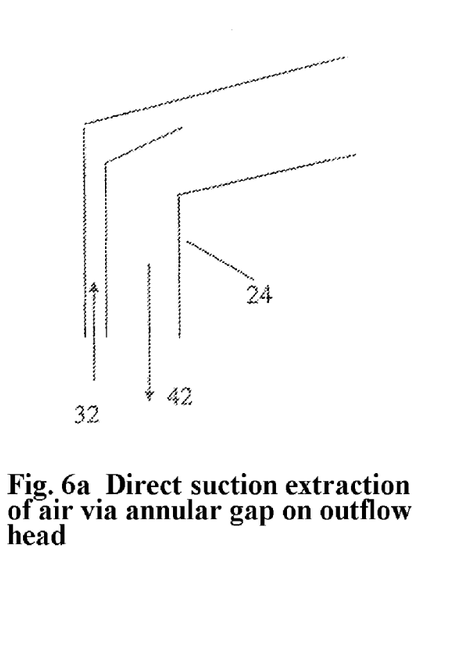
Figure 7:
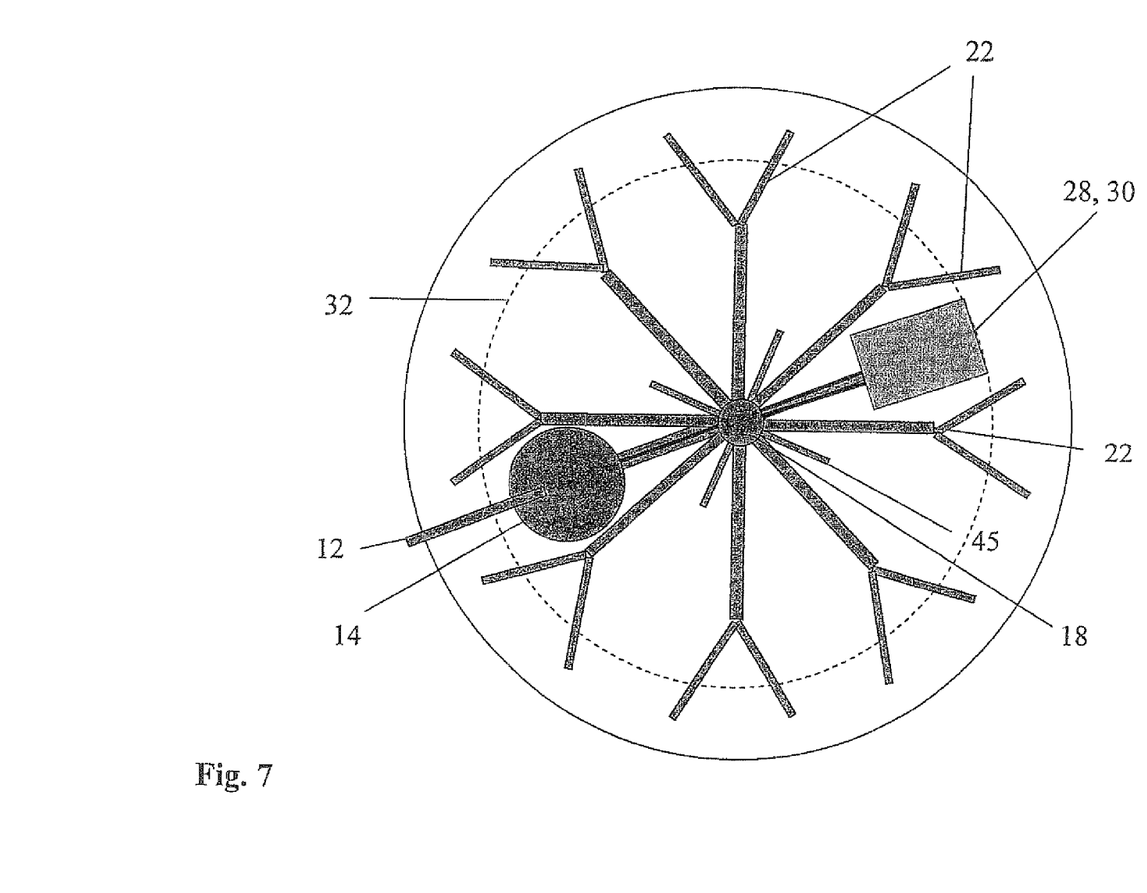
FIG. 7 shows a silo-charging variant with a distributor in air-delivery channels.

In a variant to the annular lines 32 which are used beneath the silo top 20 according to the invention, the, for all practical purposes, uniform intake operation could also take place by way of the suction extraction of air directly at the outflow heads 24 for the supply material. The openings or intake lines 33 here are connected directly to the air-delivery channels 22 for dust separation and return, and, in the case of a multiplicity of supply locations, likewise result in the uniform extraction of air from the top part of the silo (see FIG. 6). The advantage of this arrangement in relation to an annular line 32 is that there is no need for any additional openings in the silo top 20 for the installation and removal, or the maintenance, of the annular lines 32.

The invention claimed is:

1. A method of filling a large-capacity silo with a fluidizable material while preventing air-flow or gas-flow separation, comprising: conducting a material-charging operation in a controlled manner via a delivery line, a delivery channel and air- or gas-delivery channels into a top part of the large-capacity silo, towards a silo wall, and downwards to a surface of the fluidizable material above a base of the large-capacity silo at more than one material-discharging location, and further conducting a uniform and controlled suction-extraction operation at the top part of the silo of air or gas, which is carried out over a silo circumference directly at the material-discharging locations.

2. The method according to claim 1, wherein the material-charging operation for the fluidizable material for the silo is carried out via a first parallel distributor and air- or gas-delivery channels and, optionally, branching locations on the silo wall or in the vicinity of the silo wall.

3. The method according to claim 2 wherein the fluidizable material is returned in a controllable manner via a second parallel distributor in a center of the silo or in the vicinity of a center of the silo wall.

4. The method according to claim 3, wherein the return of fluidizable material is controlled via a suction fan in order to compensate for a concentration of fluidizable material in outer and inner sections in the silo.

5. The method according to claim 4 wherein dust is removed via suction-extraction lines via radially arranged air or gas-delivery channels and/or a second distributor for air-delivery channels.

6. The method according to claim 4 wherein a suction-extraction operation is carried out in annular fashion directly beneath the silo top part via annular suction-extraction lines or annular suction gaps on fluidizable material-outflow heads.

7. The method according to claim 3 wherein dust is removed via suction-extraction lines via radially arranged air or gas-delivery channels and/or a second distributor for air-delivery channels.

8. The method according to claim 3 wherein a suction-extraction operation is carried out in annular fashion directly beneath the silo top part via annular suction-extraction lines or annular suction gaps on fluidizable material-outflow heads.

9. The method according to claim 2, wherein dust is removed via suction-extraction lines via radially arranged air or gas-delivery channels and/or a second distributor for air-delivery channels.

10. The method according to claim 2 wherein a suction-extraction operation is carried out in annular fashion directly beneath the silo top part via annular suction-extraction lines or annular suction gaps on fluidizable material-outflow heads.

11. The method according to claim 1, wherein the fluidizable material is returned in a controllable manner via a second parallel distributor in a center of the silo or in the vicinity of a center of the silo top.

12. The method according to claim 11, wherein the return of fluidizable material is controlled via a suction fan in order to compensate for a concentration of fluidizable material in outer and inner sections in the silo.

13. The method according to claim 12 wherein dust is removed via suction-extraction lines via radially arranged air or gas-delivery channels and/or a second distributor for air-delivery channels.

14. The method according to claim 12 wherein a suction-extraction operation is carried out in annular fashion directly beneath the silo top part via annular suction-extraction lines or annular suction gaps on fluidizable material-outflow heads.

15. The method according to claim 11 wherein dust is removed via suction-extraction lines via radially arranged air or gas-delivery channels and/or a second distributor for air-delivery channels.

16. The method according to claim 11 wherein a suction-extraction operation is carried out in annular fashion directly beneath the silo top part via annular suction-extraction lines or annular suction gaps on fluidizable material-outflow heads.

17. The method according to claim 1, wherein dust is removed via suction-extraction lines via radially arranged air or gas-delivery channels and/or a second distributor for air-delivery channels.

18. The method according to claim 1, wherein a suction-extraction operation is carried out in annular fashion directly beneath the silo top part via annular suction-extraction lines or annular suction gaps on fluidizable material-outflow heads.

19. An arrangement for filling a large-capacity silo with a fluidizable material while preventing air-flow or gas-flow separation, and for controlling charging of the fluidizable material, said arrangement comprising: a delivery line, a delivery channel and air- or gas-delivery channels extending into a top part of the large-capacity silo at more than one material-discharging location via a first parallel distributor, in the direction of a silo wall, and downwards to a surface of the fluidizable material above a base of the large-capacity silo, and further comprising, for a uniform and controlled suction-extraction operation at the top part of the silo of air or gas to be carried out over a silo circumference directly at the material-discharging locations, one or more suction-extraction lines arranged annularly beneath the silo top part at the material-discharging locations or annular suction gaps provided on fluidizable material-outflow heads at the material-discharging locations.

20. The arrangement according to claim 19, wherein one or more suction-extraction lines are present, and comprise a suction gap.

\* \* \* \* \*